(12) United States Patent
Orozco Castillo

(10) Patent No.: US 9,770,963 B1
(45) Date of Patent: Sep. 26, 2017

(54) WINDSHIELD SUNSHADE

(71) Applicant: Ludwig D. Orozco Castillo, Garland, TX (US)

(72) Inventor: Ludwig D. Orozco Castillo, Garland, TX (US)

(\*) Notice: Subject to any disclaimer, the term of this patent is extended or adjusted under 35 U.S.C. 154(b) by 0 days.

(21) Appl. No.: 15/141,546

(22) Filed: Apr. 28, 2016

(51) Int. Cl.
*B60J 3/02* (2006.01)
(52) U.S. Cl.
CPC ...................................... *B60J 3/02* (2013.01)
(58) Field of Classification Search
CPC ..... B60J 3/00; B60J 3/02; B60J 3/0204; B60J 3/0213; B60J 1/20; B60J 1/2011; B60J 1/2013; B60J 1/203; B60J 1/2033; B60J 1/2036; B60J 1/2038; B60J 1/2041; B60J 1/2044; B60J 1/205; B60J 1/2052; B60J 1/2058; B60J 1/2061; B60J 1/2088; B60J 1/2091
USPC ......... 296/97.7, 97.1, 97.4, 97.8, 97.9, 97.11
See application file for complete search history.

(56) References Cited

U.S. PATENT DOCUMENTS

| | | | | |
|---|---|---|---|---|
| 4,815,784 A | \* | 3/1989 | Zheng | B60J 1/2091 160/329 |
| 5,423,588 A | \* | 6/1995 | Eglinton | B60J 7/085 224/324 |
| 6,796,599 B2 | \* | 9/2004 | Schlecht | B60J 1/2027 160/370.22 |
| 7,089,992 B2 | \* | 8/2006 | Walter | B60J 1/2027 160/370.22 |
| 7,316,443 B2 | \* | 1/2008 | Schlecht | B60J 1/2027 160/370.22 |
| 8,215,697 B1 | \* | 7/2012 | Lin | B60J 1/2027 160/23.1 |
| 2007/0144689 A1 | \* | 6/2007 | Walter | B60J 1/2027 160/370.22 |
| 2008/0223534 A1 | \* | 9/2008 | Hansen | B60J 1/2025 160/370.22 |

\* cited by examiner

*Primary Examiner* — H Gutman
(74) *Attorney, Agent, or Firm* — Warren V. Norred; Norred Law, PLLC

(57) ABSTRACT

The invention is a sunscreen that deploys a flexible screen by feeding a compressible member into a channel constructed into the perimeter of a screen, such that the screen then unfurls into an appropriate vehicle dash sunscreen. For storage, the member is retracted from the channel, but as the end of the member is affixed to the device, its retraction necessarily closes the screen from its open position to the compressed storage position.

1 Claim, 3 Drawing Sheets

WINDSHIELD SUNSHADE

FIELD OF THE INVENTION

The present invention relates to devices and methods of shielding cars from excessive sunlight.

BACKGROUND

Every owner of a vehicle with a windshield has learned that their vehicle's dashboard will be damaged over time by the sun's rays. In addition, vehicles tend to heat in the summer, not only by the ambient heat, but by the sunlight shining into a windshield, which is generally constructed to be a more acute angle than other windows of a car so as to reduce wind resistance.

The auto industry has developed many ways of attempting to mitigate this damage, including the tinting of vehicle windows, sunshades placed on the windshield while a car is not in use, and even mechanical shades. However, most of these approaches only work on the back window, where mechanical shades are employed on nicer vehicles), or on side windows, where tinting is less regulated.

Many states regulate the allowable tint on a windshield, and the market has not yet seen a vehicle with the roll up screen on a front window, as the front windshield is curved more than the back on most cars, and visibility is necessarily harmed by the semi-opaque screens found on back windshields.

The most common solution used by vehicle owners is an inexpensive sun shield that folds in an accordion style for storage, as described in U.S. Pat. No. 4,652,039 to Richards. These folding sun shields are typically made of a cardboard or other rigid lightweight material, and offered in a few basic sizes, or alternatively, shaped to fit specific vehicles so they more easily are held in place between the crevice created between the windshield and front dash at the bottom, and at the top by a vehicle's rear view mirror and pull-down sun visors. More rarely, this type of sun shield is constructed to roll up for storage.

In recent years, the market has enjoyed the widespread use of collapsible compressible structures in which a spring-effect maintains pressure on the shade to remain open, as disclosed in Zheng's U.S. Pat. No. 4,815,784. These collapsible screens are generally stored by folding them using a precise process as described in Zheng. When folded, these collapsible units must be held in the folded position or they naturally unfold. Many people never able to learn the manually looping technique needed to fold and store these screens in their smaller stored position, but rather simply throw the screen into the vehicle's back seat.

Other inventors have attempted to address this common problem with many approaches, including: a) the retracting sun visor descried in U.S. Pat. No. 7,216,917 by Tadakamalla; b) the dual-pillar assembly of U.S. Pat. No. 9,039,064 in which screens scroll out from the sides of the windshield and are pulled together; c) an automated screen disclosed by Chen in U.S. Pat. No. 9,079,479, in which a suction-cup installed on windshields using a rigid part and a removable flexible section is available by the user; d) magnetically affixing the screen in place by attraction to the vehicle frame, disclosed by Middleton in U.S. Pat. No. 8,556,328; e) screens held in place by an unfolding frame, revealed by Chai in U.S. Pat. No. 6,904,923, Huang in U.S. Pat. No. 6,705,381, and Mitchell in U.S. Pat. No. 6,095,230, among others; and f) an air-actuated curtain in U.S. Pat. No. 5,085,473.

The disclosures of the above-referenced patents are herein incorporated by reference in full to this specification.

While each of the above-referenced patents and approaches have their place, there remains yet a need to have a simple, collapsible screen that may be more compact and simple to use, which this specification intends to disclose.

This background information is provided to reveal information believed by the applicant to be of possible relevance to the present invention. No admission is intended, nor should be construed, that any of the preceding information constitutes prior art against the present invention.

SUMMARY OF THE INVENTION

With the above in mind, embodiments of the present invention are related to a sunscreen and method of use, in which a user deploys a flexible screen by feeding a compressible member into a channel constructed into the perimeter of the screen, such that the screen then unfurls into an open position that the user can use for a vehicle sun screen. For storage, the member is retracted from the channel, but as the end of the member is affixed to the device, its retraction necessarily closes the screen from its open position to the compressed storage position.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring now to FIGS. 1-4, a device, according to an embodiment of the present invention disclosed is a Windshield Sunscreen 11, comprising a Screen 13, a compressible Member 15, and a Retractor 17.

Figure 1:
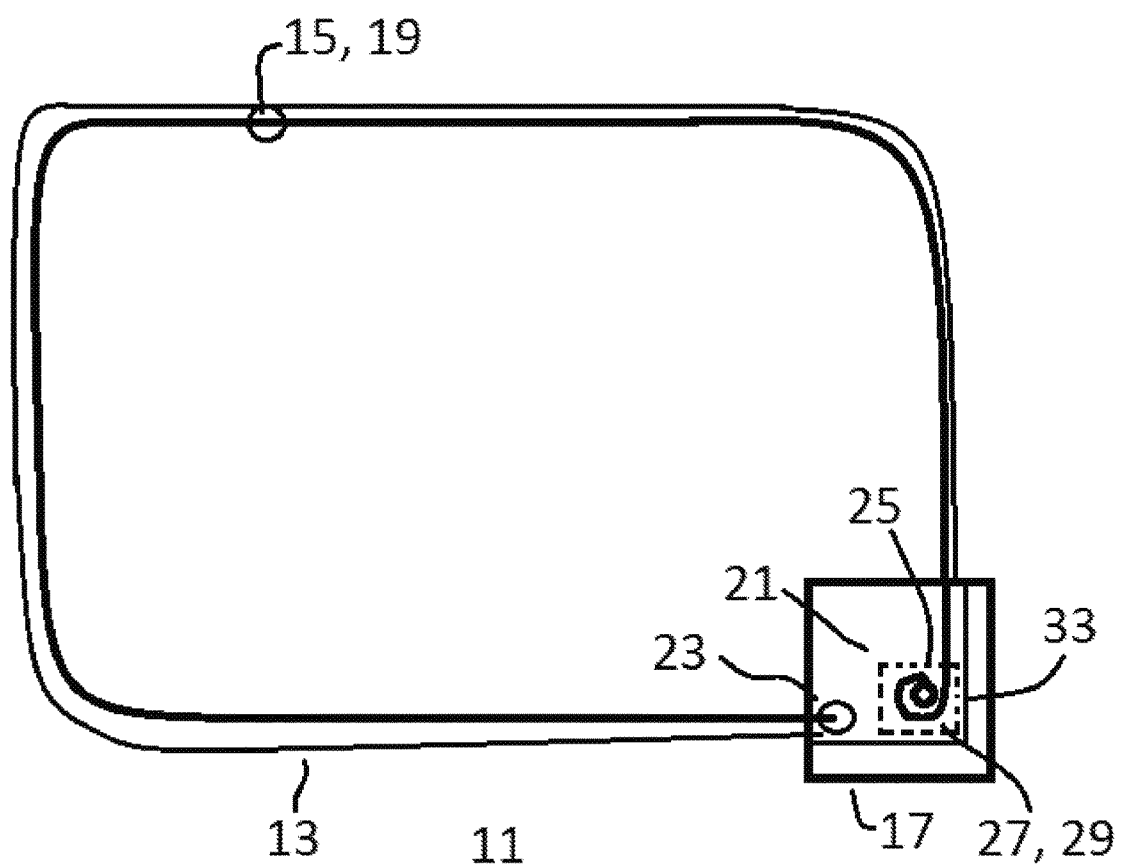
FIG. 1 is a front view of the sunscreen in its open position and a transparent retractor front using a motor in the reactor.
Figure 2:
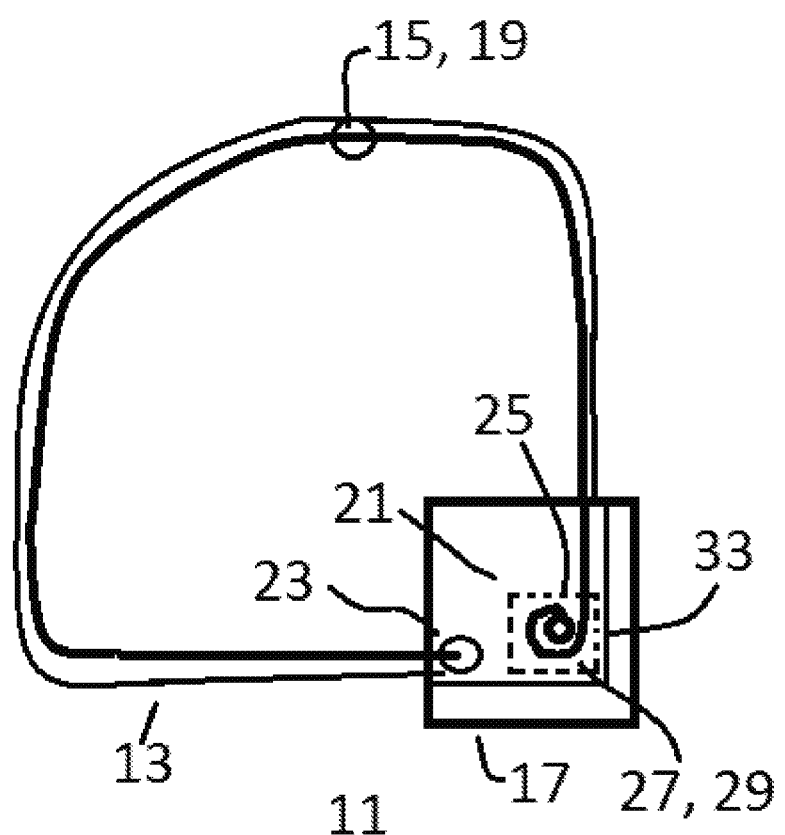
FIG. 2 is a front view of the sunscreen of FIG. 1 in a partially closed position.
Figure 3:
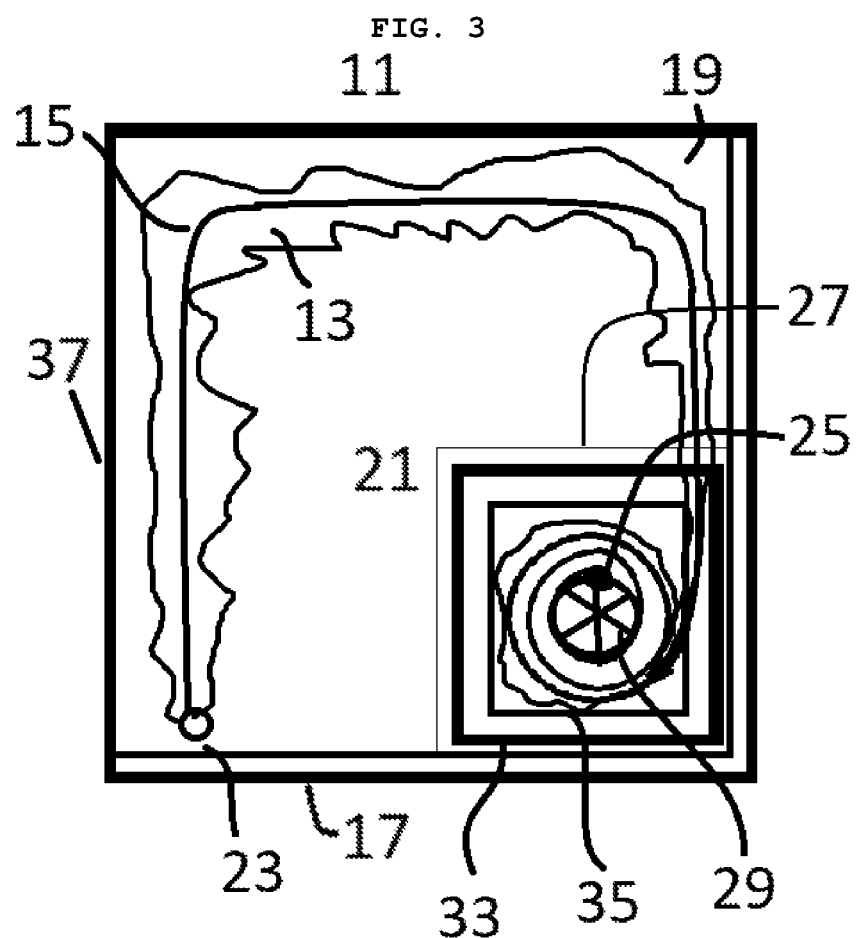
FIG. 3 is a front view of the sunscreen of FIG. 1 in its closed position.

The Windshield Sunscreen 11 is intended to be in one of two general positions, which include the open position as seen in FIG. 1, or closed as shown in FIG. 3. FIG. 2 shows a partially open position of Screen 13 for explanatory purposes.

The Windshield Sunscreen 11 is employed as a sunscreen while in the open position, and stored in the closed position.

To simplify and for ease of understanding, the embodiment used in FIG. 1 through FIG. 3 shows a transparent Retractor 17 using a Motor 33 to provide the torque necessary to retract and expand the Member 15. Note that the Motor 33 and optional Gearbox are show in hidden lines of FIGS. 1-3.

The Screen 13 is held either open or closed by the compressible Member 15, which travels through a Channel 19 that is constructed along the perimeter of the Screen 13. In the current embodiment the Channel 19 is a hemmed passage of the same material as the Screen 13. The Channel 19 is constructed to match the size of the Member 15 so that the Member 15 cannot double-back on itself, but when pushed through the Channel 19, will extend through the Channel 19.

The Member 15 is constructed as a compressible elastic component resisting deformity from its original straight construction, but not so rigid that it cannot be wound on the Spool 29. As the Member 15 is extended through the curved Channel 19, the Member pushes against the curvature of the Channel 19, pressuring the Screen 13 to adopt the shape created by the Channel when the Screen 13 is laid flat. The Member 15 in the Channel 19 creates a radial tension useful for keeping the Sunscreen 11 against the groove between the windshield and windshield frame when in use.

As shown in FIG. 1-3, the Retractor 17 further comprises a Compartment 21 into which two anchor points are constructed. The First Anchor Point 23 is a holding ring mounted into the Compartment 21, to which one end of the Member 15 can be attached. The second Anchor Point 25 is attached to a Spool 29 in the Reel 27 that is also part of the Retractor, so when the Reel 27 is operated, the Spool 29 is rotated to release or retract the Member 15 from the Reel 27, as measured from the First Anchor Point 23 and along the Member 15 to the entrance of the Retractor 17.

A user can therefore prepare the Windshield Sunscreen 11 for use in a vehicle by operating the Retractor 17, so the Spool 29 is rotated within the Reel 27 and the length of the Member 15 is increased, and as more of the Member 15 is extended through the Channel 19 in the Screen 13, and the expanding loop created by the extended Member 15 necessarily unfurls the Windshield Sunscreen 11 to the open position.

To close the Windshield Sunscreen 11, the user operates the Retractor 17 to withdraw the Member 15 back into the Retractor 17, which collapses the Screen 13 along the path of the Member 15 and pulling the Screen 13 into the Compartment 21 of the Retractor 17, as seen on FIG. 3.

Once the Sunscreen 11 is fully retracted into the Retractor 17, the user can treat it as a folded umbrella, tossed in the floor of the vehicle or a side pocket of the door, or mounted to the dashboard.

The Retractor 17 includes a Compartment Opening 37 along the side of the Retractor so the Screen 13 can expand out as the Member is extended. This open section is indicated on FIG. 3 by the thinner line along the left and top walls, and more clearly indicated in FIG. 4, showing the Reactor 17 with Crank 31 option.

The Retractor 17 can be constructed in a number of ways. In the construction shown in FIG. 1-3, the Retractor 17 includes the Compartment 21 on one side, and the Reel 27. The Reel 27 comprises the Spool 29 and a means of turning the Spool 29 is a Motor 33.

Figure 4:
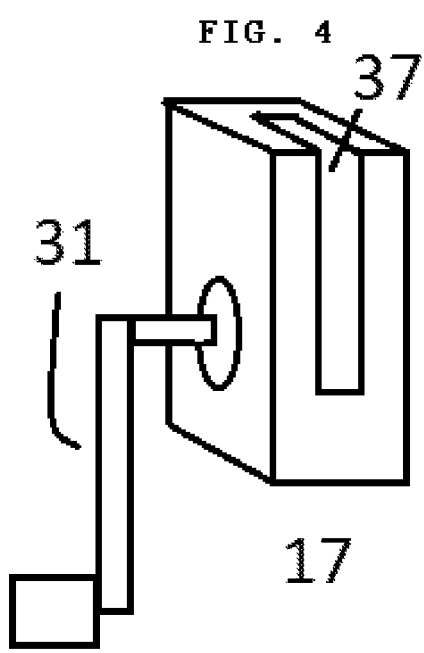
FIG. 4 shows an orthogonal view of a second embodiment of a retractor using a crank to operate the retractor.

FIG. 4 shows a construction using a Crank 31 that can be turned by a user to wind and unwind the Member 15 from the Spool 29.

An additional option is to construct the Motor 33 so it includes a Gearbox 35 to allow the motor to be smaller, and has the added advantage that the force of the Member 15 while wound on the Spool 29 would not be able to exert pressure to unwind from the Reel 27 because the Gearbox 35 would prevent Spool 29 movement without the Motor 33 turning the Gearbox 35, because gearboxes can easily be built to be difficult to turn from pressure on the output shaft.

This disclosure is not intended to exhaust the variations of every kind of method by which the Member 15 is extended and retracted through the Channel 19 or the shape of the Screen 13, irrespective of the shape shown in the figures.

While the invention has been described with reference to exemplary embodiments, it will be understood by those skilled in the art that various changes may be made and equivalents may be substituted for elements thereof without departing from the scope of the invention.

A legend of the components discussed in the application and shown on the drawings is as follows:

| | |
|---|---|
| 11 Windshield Sunscreen | 25 Second Anchor Point |
| 13 Screen | 27 Reel |
| 15 Member | 29 Spool |
| 17 Retractor | 31 Crank |
| 19 Channel | 33 Motor |
| 21 Compartment | 35 Gearbox |
| 23 First Anchor Point | 37 Compartment Opening |

The inventor claims:

1. A sunscreen comprising:
   a. a flexible screen that is compressible in both width and height;
   b. a compressible and flexible member separate from the flexible screen;
   c. a channel constructed along a section of the screen, sized to allow the member to be extended through the channel;
   d. a rotatable spool around which the member can be wound when retracted from the channel;
   e. a reel onto which said spool is mounted;
   f. a compartment sized to enclose said screen when said screen is wound onto said spool;
   g. a first anchor point located on the sunscreen to which one end of the member is affixed;
   h. a second anchor point located on said spool, constructed such that said screen expands or contracts in both width and height as the member is extended or retracted from said spool when said spool is rotated one way or the other, respectively;

i. a means of rotating the spool comprising either a hand crank or motor.

\* \* \* \* \*